US008249606B1

(12) United States Patent
Neophytou et al.

(10) Patent No.: US 8,249,606 B1
(45) Date of Patent: Aug. 21, 2012

(54) FREQUENCY PLANNING OPTIMIZATION FOR MOBILE COMMUNICATIONS

(75) Inventors: Christos Neophytou, Centennial, CO (US); Khalid Abdul-Aziz Hamied, Alpharetta, GA (US); Ramon Toril, Málaga (ES)

(73) Assignee: Optimi Corporation, Atlanta, GA (US)

( * ) Notice: Subject to any disclaimer, the term of this patent is extended or adjusted under 35 U.S.C. 154(b) by 640 days.

(21) Appl. No.: 12/368,365

(22) Filed: Feb. 10, 2009

Related U.S. Application Data

(60) Provisional application No. 61/084,791, filed on Jul. 30, 2008.

(51) Int. Cl.
*H04W 40/20* (2009.01)
*H04W 72/00* (2009.01)
*H04B 15/00* (2006.01)

(52) U.S. Cl. ....... 455/446; 455/62; 455/63.3; 455/452.1

(58) Field of Classification Search .......... 455/446–447, 455/62, 63.3
See application file for complete search history.

(56) References Cited

U.S. PATENT DOCUMENTS

| | | | |
|---|---|---|---|
| 5,758,264 A * | 5/1998 | Bonta et al. ................... 455/67.7 |
| 5,822,699 A * | 10/1998 | Kotzin et al. ................... 455/447 |
| 6,094,580 A * | 7/2000 | Yu et al. ....................... 455/446 |
| 6,253,086 B1 * | 6/2001 | Parantainen et al. .......... 455/446 |
| 6,480,718 B1 * | 11/2002 | Tse .............................. 455/446 |
| 7,142,523 B1 * | 11/2006 | Chekuri et al. ............... 455/446 |
| 2003/0013451 A1 * | 1/2003 | Walton ......................... 455/447 |
| 2004/0203727 A1 * | 10/2004 | Abiri et al. ................... 455/423 |
| 2006/0009226 A1 * | 1/2006 | Vicharelli et al. ............. 455/450 |
| 2008/0176519 A1 * | 7/2008 | Kwak et al. ................. 455/67.13 |

FOREIGN PATENT DOCUMENTS

GB 2404118 A * 1/2005

* cited by examiner

*Primary Examiner* — Nick Corsaro
*Assistant Examiner* — Tangela T. Chambers
(74) *Attorney, Agent, or Firm* — Hope Baldauff Hartman, LLC

(57) ABSTRACT

Technologies for optimizing frequency allocations in mobile communication systems can include a probabilistic model that can consider interference quality, coverage quality, frequency hop set length, service type, environment, and mobile radio speed. A frame erasure rate (FER) objective for call quality may be used as a key performance metric as FER performance can be closely related to voice quality. Mobile allocation list (MAL) length selection during the optimization can attempt to optimize the MAL length at the sector level. Choosing a MAL length per cell can provide an additional degree of freedom during the optimization process. The model can consider signal quality of neighbor cells in handover areas. The model can trade off co-channel and adjacent channel interference. Co-channel interference can be reduced at the expense of adjacent channel interference.

20 Claims, 13 Drawing Sheets

510

| MALSIZE | C/I @ 2% FER | FDGAIN |
|---|---|---|
| 1 | 15.8 | 0.0 |
| 2 | 13.8 | 2.0 |
| 3 | 13.0 | 2.8 |
| 4 | 12.2 | 3.6 |
| 5 | 11.8 | 4.0 |
| 6 | 11.7 | 4.2 |
| 7 | 11.6 | 4.2 |
| 8 | 11.4 | 4.4 |
| 12 | 11.5 | 4.4 |
| 15 | 11.3 | 4.5 |

520

| MALSIZE | C/N @ 2% FER | FDGAIN |
|---|---|---|
| 1 | 13.0 | 0.0 |
| 2 | 11.0 | 2.0 |
| 3 | 10.2 | 2.8 |
| 4 | 10.0 | 3.0 |
| 15 | 9.0 | 4.0 |

*FIG. 5*

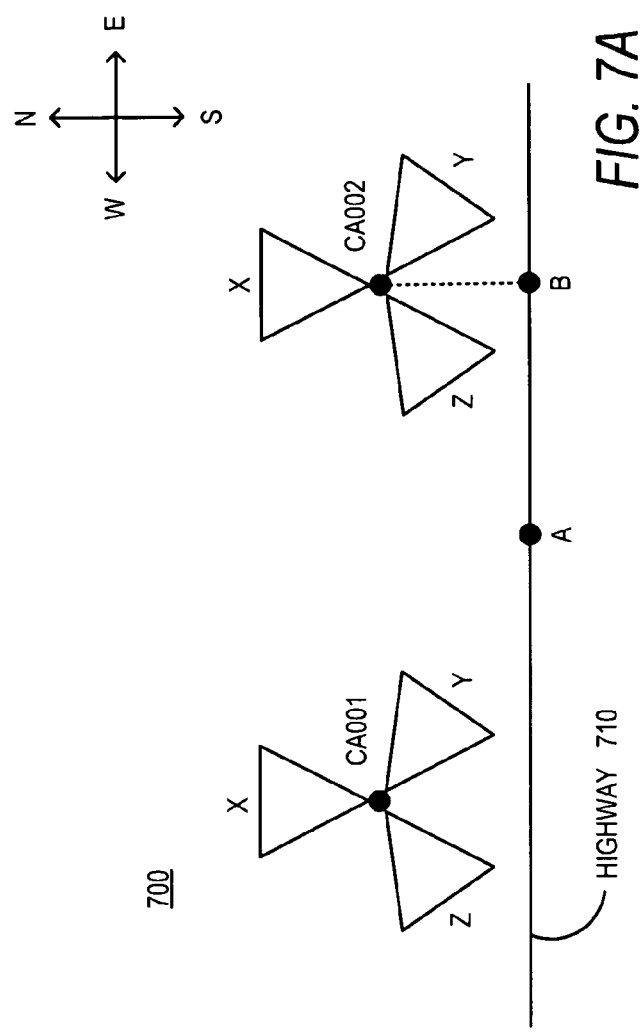

| METRIC | C/I MODEL | FER MODEL | IMPROVEMENT |
|---|---|---|---|
| TRAFFIC % WITH C/I < 12 dB | 3.93% | 2.64% | 32% |
| TRAFFIC % WITH FER > 2% | 2.94% | 2.06% | 30% |

FREQUENCY PLANNING OPTIMIZATION FOR MOBILE COMMUNICATIONS

CROSS-REFERENCE TO RELATED APPLICATION

This application claims the benefit of U.S. provisional patent application No. 61/084,791, filed on Jul. 30, 2008, and entitled "Frequency Planning Optimization for Mobile Communications" which is expressly incorporated herein by reference in its entirety.

BACKGROUND

A goal of mobile communication system operators, such as operators of systems using the global system for mobile communications (GSM), is to improve overall network performance. Some of the main performance indicators are voice quality, drop performance, and other similar metrics. Voice quality can be characterized, for example, by a mean opinion score (MOS). Drop performance can be characterized, for example, by dropped call rate, number of drops per minutes of use, and so forth.

A critical factor that controls mobile system performance is the frequency plan. A frequency plan can allocate frequencies to various physical locations, and radio resources within the wireless radio access network. Traditional frequency planning techniques generally optimize frequency plans in terms of interference quality. Interference quality can be specified by carrier to interference ratios (CIR or C/I). Furthermore, traditional frequency planning techniques generally consider C/I in the cell serving area. Effects such as coverage quality in the cell serving area, C/I performance in handover areas, and handover failure rate are not generally considered for the purposes of frequency planning.

It is with respect to these considerations and others that the disclosure made herein is presented.

SUMMARY

Technologies are described herein for optimizing frequency allocations in mobile communication systems. A probabilistic model for optimizing frequency plans can consider interference quality, coverage quality, frequency hop set length, service type, environment, and mobile radio speed. The interference quality can be specified by a carrier to interference ratio (CIR or C/I). The coverage quality can be specified by a carrier to noise ratio (CNR or C/N). The frequency hop set length can indicate the number of frequencies used for hopping within a frequency hopped channel. Frequency hop set length can be specified by a mobile allocation list length (MAL length).

According to one embodiment, a frame erasure rate (FER) objective for call quality may be used as a key performance metric. FER performance can be closely related to voice quality. Voice quality and drop call rate performance can be directly dependent on speech codec FER and FER of the Slow Associate Control Channel (SACCH FER) respectively. A probabilistic model can combine interference quality (C/I ratio) and coverage quality (C/N ratio).

According to another embodiment, MAL length selection during the optimization can attempt to optimize the MAL length at the sector level. Using the technology discussed herein, the MAL length can be selected for each individual cell instead of having a single value for the MAL length of all cells. The MAL length can be set for each cell with a goal of improving overall network call quality and reducing drop call rate. The ability of choosing a MAL length per cell can provide an additional degree of freedom during the optimization process and improve performance.

According to yet another embodiment, a model can consider signal quality of neighbor cells in the handover areas. Second order neighbor relationships can support determining the likelihood that a handover from a serving cell to a candidate neighbor cell will fail due to interference on the Broadcast Control Channels (BCCH) channel of a neighbor cell.

According to yet another embodiment, a model can trade off co-channel and adjacent channel interference. Co-channel interference can be reduced at the expense of adjacent channel interference. When considering individual interference components, each can be ignored or not based on imposed thresholds. An individual interference component can be defined for a given victim cell as the amount of interference from a single interfering cell for a given reuse type.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a set of threshold tables illustrating minimum required C/I and C/N thresholds as a function of MAL length according to one exemplary embodiment;

FIG. 7A is a base station mapping diagram illustrating handover characteristics for two neighboring base stations according to one exemplary embodiment;

FIG. 8 is a wireless performance table illustrating performance metrics for different optimization models according to one exemplary embodiment;

DETAILED DESCRIPTION

Figure 1:
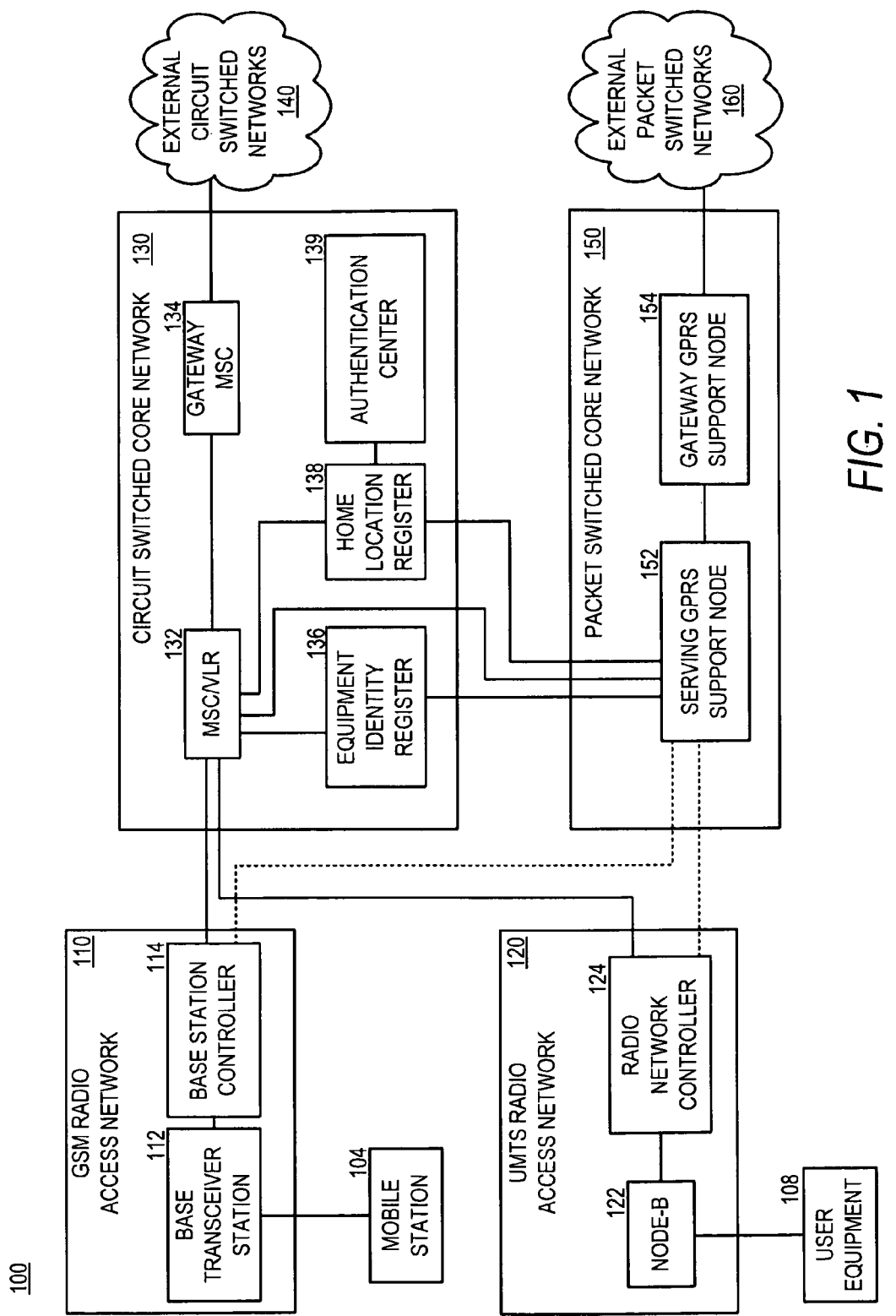
FIG. 1 is a network architecture diagram illustrating aspects of a GSM and UMTS mobile wireless communication system according to one exemplary embodiment.

The following description is directed to technologies for optimizing frequency allocations in mobile communication systems. Through the use of the embodiments presented herein, a probabilistic model for optimizing frequency plans can consider interference quality, coverage quality, frequency hop set length, service type, environment, and mobile radio speed.

While the subject matter described herein is presented in the general context of program modules that execute in conjunction with the execution of an operating system and application programs on a computer system or embedded processor system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for optimizing frequency plans for mobile wireless communications networks will be described in detail.

Turning now to FIG. 1, details will be provided regarding an illustrative operating environment for the implementations presented herein, as well as aspects of several software components that provide the functionality described herein for optimizing frequency plans in mobile wireless communications networks. In particular, FIG. 1 is a network architecture diagram illustrating aspects of a Global System for Mobile (GSM) and Universal Mobile Telecommunications System (UMTS) mobile wireless communication system 100 according to one exemplary embodiment.

A GSM radio access network (GSM RAN) 110 can service multiple mobile subscribers such as a mobile station 104. A base station subsystem (BSS) can handle traffic and signaling between a mobile station 104 and the telephone switching network. The BSS can include a base transceiver station (BTS) 112 providing multiple transceivers, antennas, and other radio equipment to support transmitting and receiving radio signals with the mobile stations 104 being serviced. A "Um" link, or air interface, can be established between each mobile station 104 and the BTS 112. Radio frequency resources used to communicate with mobile stations 104 may be subject to frequency planning as discussed herein.

A base station controller (BSC) 114 associated with the BTS 112 can provide control intelligence for the GSM RAN 110. A BSC 114 can have multiple BTS systems 112 under its control. The BSC 114 can allocate radio channels, receive measurements from mobile stations 104, and control handovers from one BTS 112 to another. The interface between a BTS 112 and a BSC 114 can be an "Abis" link. The BSC 114 can act as a concentrator where many Abis links can be aggregated and relayed to the network core.

A UMTS radio access network (UMTS RAN) 120 can provide another example of a base station subsystem (BSS). UMTS is an example of a third generation (3G) mobile communications technology. The UMTS RAN 120 can service mobile units, such as user equipment 108. The air interface in a UMTS RAN 120 can be referred to as a "Uu" link. A UMTS base station subsystem can include a Nobe-B 122 and a radio network controller (RNC) 124. A Node-B 122 and a RNC 124 can be interconnected by an "Iub" link.

An RNC 124 or BSC 114 can generally support as many as hundreds of Node-B 122 or BTS 112 respectively. A Node-B 122 or BTS 112 can generally support three or six cells, although other numbers may be used. Multiple GSM RAN 110 base stations or UTMS RAN 120 base stations can connect to either of both of a circuit switched core network 130 or a packet switched core network 150

A BSC 114 within a GSM RAN 110 can connect to a MSC/VLR 132 within a circuit switched core network 130 over an "A" Link. An "A" link can carry traffic channels and SS7 control signaling. Similarly, a BSC 114 within a GSM RAN 110 can connect to a serving GPRS support node (SGSN) 152 within a packet switched core network 150 over a "Gb" link.

An RNC 124 within a UMTS RAN 120 can connect to a MSC/VLR 132 within a circuit switched core network 130 over an "Iu-CS" link. Similarly, an RNC 124 within a UMTS RAN 120 can connect to a serving GPRS support node (SGSN) 152 within a packet switched core network 150 over an "Iu-PS" link.

Within the circuit switched core network 130, the MSC/VLR 132 can interface to an equipment identity register 136, a home location register 138, and an authentication center 139. The MSC/VLR 132 can also interface to a gateway mobile switching center 134 to access external circuit switched networks 140. External circuit switched networks 140 may include Integrated Services Digital Network (ISDN) systems, Public Switched Telephone Network (PSTN) systems, and various other circuit switched technologies.

Within the packet switched core network 150, the SGSN 152 can interface with a gateway GPRS support node (GGSN) 154 to access external packet switched networks 160. External packet switched networks 160 can include the Internet, intranets, extranets, and various other packet data network technologies.

Figure 2:
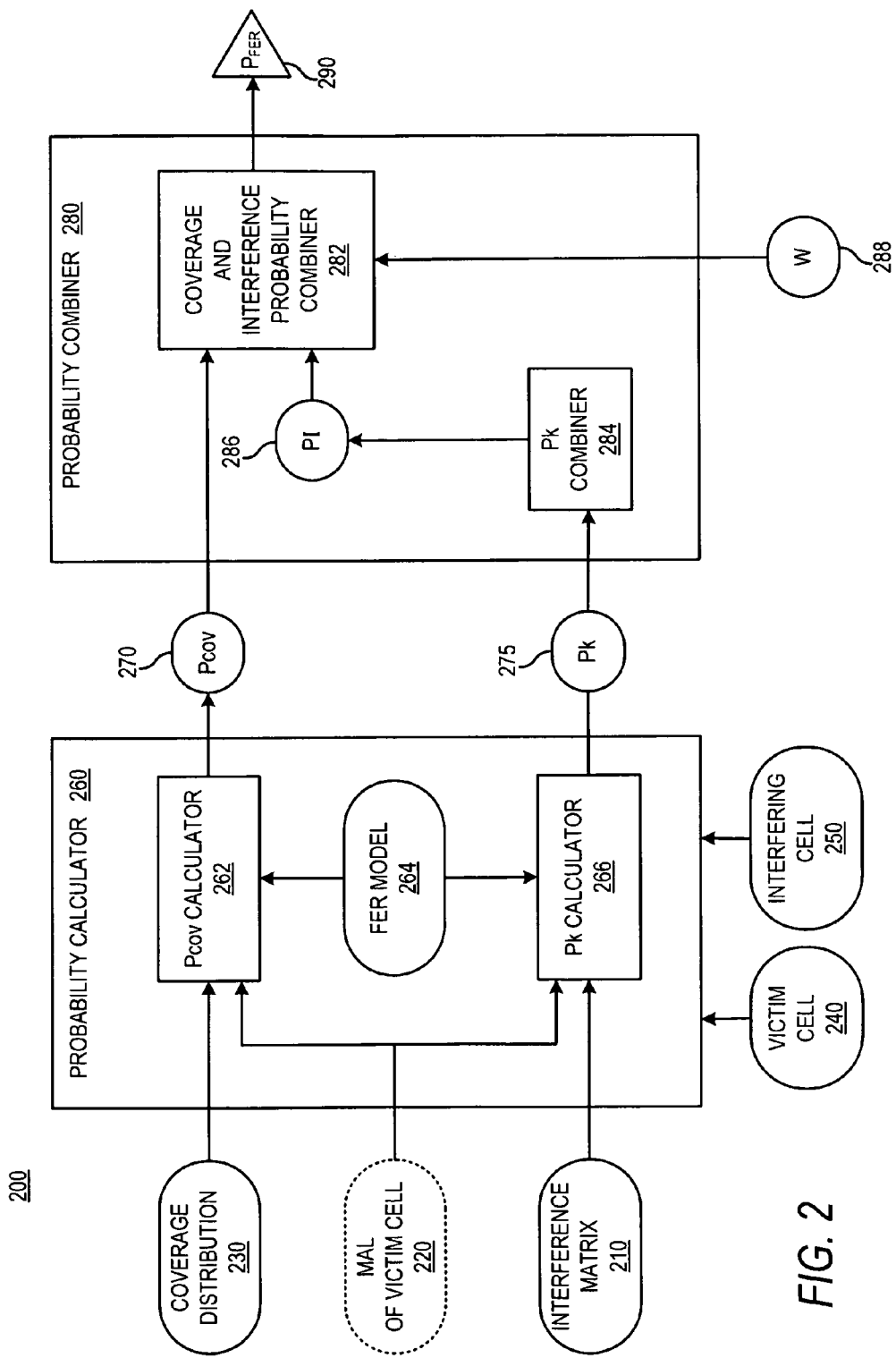
FIG. 2 is a functional block diagram illustrating calculating and combining probabilities for a frame erasure rate model according to one exemplary embodiment.

Referring now to FIG. 2, a functional block diagram 200 illustrates calculating and combining probabilities for a frame erasure rate model according to one exemplary embodiment. A probabilistic model for frequency planning in a mobile wireless network can use frame erasure rate (FER) as an operational performance metric. Information in the communication channels of a wireless system can be divided into frames. Frames may be protected by coding such as error detection coding and error correction coding (ECC). A frame having errors that may not be recovered by coding can be removed, or erased, from the data stream. The number of frames erased in a period of time can be quantified as a FER.

An increased erasure of frames can result in decreased or degraded voice quality or an increased dropped call rate. Poor voice quality can be related to speech codec FER. Call drop rate can be related to the FER of a slow associate control channel (SACCH FER). Speech codec FER and SACCH FER can be dependent on interference quality (such as C/I), coverage quality (such as C/N), MAL length, and other variables.

Several system parameters can be used as inputs for determining the FER with a probabilistic model. One parameter, a service type, can be specified within the model as related to a specific channel being analyzed. For example, a GSM service type can be one of the GSM logical channels, such as speech codec, SACCH, stand-alone dedicated control channel (SD-CCH), or fast associated control channel (FACCH). Another parameter, the operating environment, can be represented as a specific power delay profile. For example, a GSM power delay profile can be used to specify the environment, such as the TU, BU, HT, and RA power delay profiles. Yet another parameter, the speed of the mobile radio, may be given as a spatial rate value, such as 3 km/hr, 50 km/hr, 100 km/hr, 250 km/hr, any other number of km/hr, miles/hr, or any other distance/time value. Using these parameters, FER can be given as a function of interference quality (C/I ratio), coverage quality (C/N ratio), MAL length, service type, environment, and speed. In other words, FER=f(C/I, C/N, MAL length, service, environment, speed).

In the FER expression provided, service, environment and speed may be determined on a per-call, per-cell basis by instantaneous usage conditions. Therefore, the optimization process can support generating a frequency plan based on C/I, C/N, and MAL length. Since the optimization cost function can change with MAL length, optimizations to the MAL length can be supported in addition to the frequency assignments.

A particular metric that can be considered in optimizing the frequency allocation is the "percentage of the total amount of traffic with poor FER" which can be referred to as "percentage of poor FER". An example FER threshold for poor quality can be specified as two percent although other values could be used as well. A probability calculator 260 and a probability combiner 280 can be used to determine a probability of poor FER ($P_{FER}$) 290.

Inputs to the probability calculator 260 can include an interference matrix (IM) 210, a MAL length for the victim cell 220, and a coverage distribution 230. The IM 210 can be a matrix where the (X,Y) matrix element can represent interference where CELL X is the victim cell and CELL Y is the interfering cell. The interference can be represented as C/I distribution parameters that provide statistics regarding CELL Y causing interference to CELL X when both cells use the same frequency at full power. For example, given a C/I threshold for acceptable co-channel interference, the percentage of time that CELL Y will interfere with CELL X can be determined from the interference representation within the IM 210. The coverage distribution 230 can be given by a C/N distribution for the victim cell. The coverage distribution 230 can also be given by a received signal level (RXLEV) distribution or by the related RXLEV statistics. This can be considered a distribution of serving signal strength in the serving area of the cell. A relationship between C/N and RXLEV can be established for a given noise floor. For example, with the GSM thermal noise floor of N=−111 dBm, C/N can be computed as:

C/N(dB)=C(dBm)−N(dBm)=RXLEV(dBm)+111 dBm.

The probability calculator 260 can also use an FER model 264. An FER model 264 can be provided for a given service type, channel profile, and speed. The FER model 264 can include a set of FER relationships to C/I for given MAL lengths along with a set of FER relationships to C/N for given MAL lengths.

The probability calculator 260 can, for each victim cell 240, identify related interfering cells 250. The interfering cells 250 can be sources of co-channel interference, adjacent channel interference, or both. A $P_{COV}$ calculator 262 within the probability calculator 260 can use the C/N coverage distribution 230 and the FER model 264 to compute the probability of poor coverage $P_{COV}$ 270. Similarly, a $P_K$ calculator 266 within the probability calculator 260 can use the interference matrix 210 and the FER model 264 to compute the probability of interference from each interferer k given as $P_K$ 275.

A probability combiner 280 can provide the probability of poor FER ($P_{FER}$) 290. The probability combiner 280 may be based on the notion that poor FER can be due to either poor C/I FER or to poor C/N FER. The probability of these two continuants can be given by $P_I$ 286 and $P_{COV}$ 270 respectively. Where $P_I$ 286 is the total interference probability from a set of k=1 . . . M interfering cells 250 each providing an individual interfering probability $P_K$ 275. Using an assumption that the M interferers are statistically independent, $P_I$ 286 can be computed by a $P_K$ combiner 284 from the k=1 . . . M interfering probabilities $P_K$ 275 as follows:

$$P_I = 1 - (1-P_1)*(1-P_2)* \ldots *(1-P_M)$$

Since C/I and C/N may not necessarily be statistically independent, the related probabilities $P_I$ 286 and $P_{COV}$ 270 may not be directly combined. Instead, the probabilities can be combined by addition along with subtracting out the probability that the two probabilities overlap. The overlap probability can be given by the expression:

$$P_{COV}*P_{I|COV},$$

or the probability of poor C/N FER times the probability of poor C/I FER given poor C/N FER. The final combination of $P_I$ 286 and $P_{COV}$ 270, accounting for the subtracted overlap probability may be formalized and simplified as follows:

$$P_{FER} = P_I + P_{COV} - P_{COV}*P_{I|COV}$$

$$P_{FER} = P_I + P_{COV}(1 - P_{I|COV})$$

$$P_{FER} = P_I + W*P_{COV},$$

where W=(1−$P_{I|COV}$). The parameter W 288 can be estimated from empirical data and according to one embodiment may take on values ranging from 0.05 to 0.2. It should be appreciated that other values for W 288 may manifest according to embodiments. The parameter W 288 can be provided as an input to the probability combiner 280. The parameter W 288 can be used by a coverage and interference probability combiner 282 to provide $P_{FER}$ 290.

$P_{FER}$ 290, as calculated by the probability combiner 280 can support frequency planning optimization. The probabilistic model can support the computation of $P_{FER}$ 290 with results that are very close to simulation results. However, running a system simulation can take about thirty times longer than the probabilistic computations according to embodiments.

The victim cell MAL length 220 input to the probability calculator 260 can be varied to find the MAL length assignment for each cell that provides improved $P_{FER}$ 290 results. Traditionally, mobile communication system engineers use rules of thumb to manually specify MAL lengths. Using the technology discussed herein to establish a MAL length for each individual cell can support reducing overall network call quality impairment and drop call rate. Establishing a MAL length independently for each cell can provide an additional degree of freedom during the optimization process. This can also improve performance over operating with one system-wide MAL length.

Mobile wireless communication systems, such as GSM radio networks, can support improved voice quality, drop call rate and accessibility performance using the frequency planning technology discussed herein. These benefits may be achieved with reduced or avoided capital expenditure for additional spectrum, cell sites, transceivers (TRX), antennas, or other resources. This may be attractive in cases where GSM operators desire to carve out spectrum to deploy Third Generation (3G) systems or Universal Mobile Telecommunications System (UMTS). Techniques discussed herein can reduce performance impacts in the GSM network operating with reduced frequency spectrum support.

Figure 3:
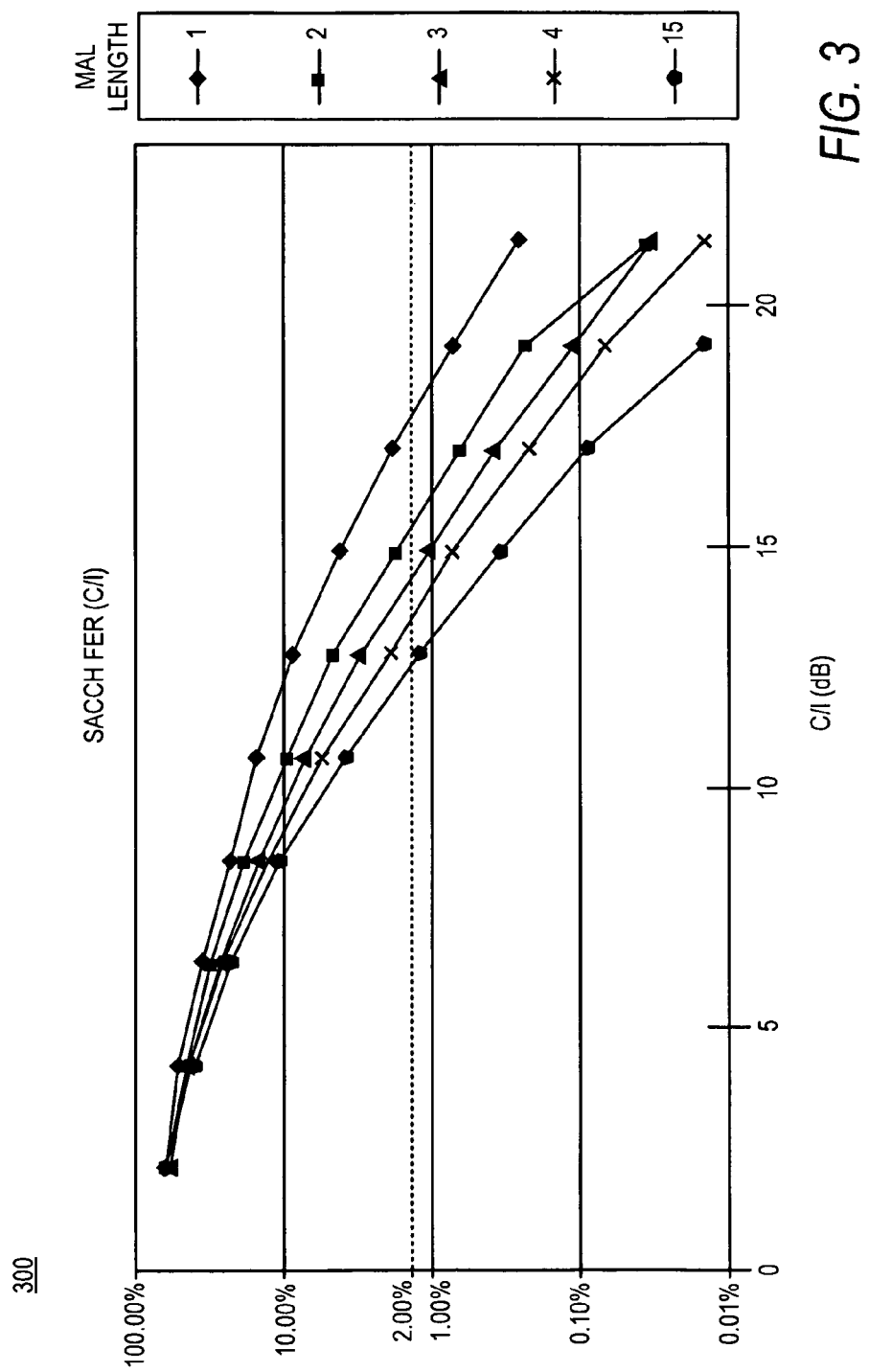
FIG. 3 is a frame erasure rate plot illustrating a set of interference based FER relationships according to one exemplary embodiment.

Referring now to FIG. 3, a frame erasure rate plot illustrates a set of interference based FER relationships according to one exemplary embodiment. A family of SACCH FER curves can represent the FER relationships for various MAL lengths. These relationships can be part of the FER model 264 used by the probability calculator 260. The FER model 264 for a given service type, channel profile and speed can be a set of FER relationships to C/I for given MAL lengths. The illustrated example shows SACCH FER relationships for a TU3 environment having power profile TU and mobile radio speed of three km/hr.

An example FER threshold used for poor FER can be two percent. A dotted line in the illustration shows the example FER threshold of two percent. Different thresholds can also be used.

Figure 4:
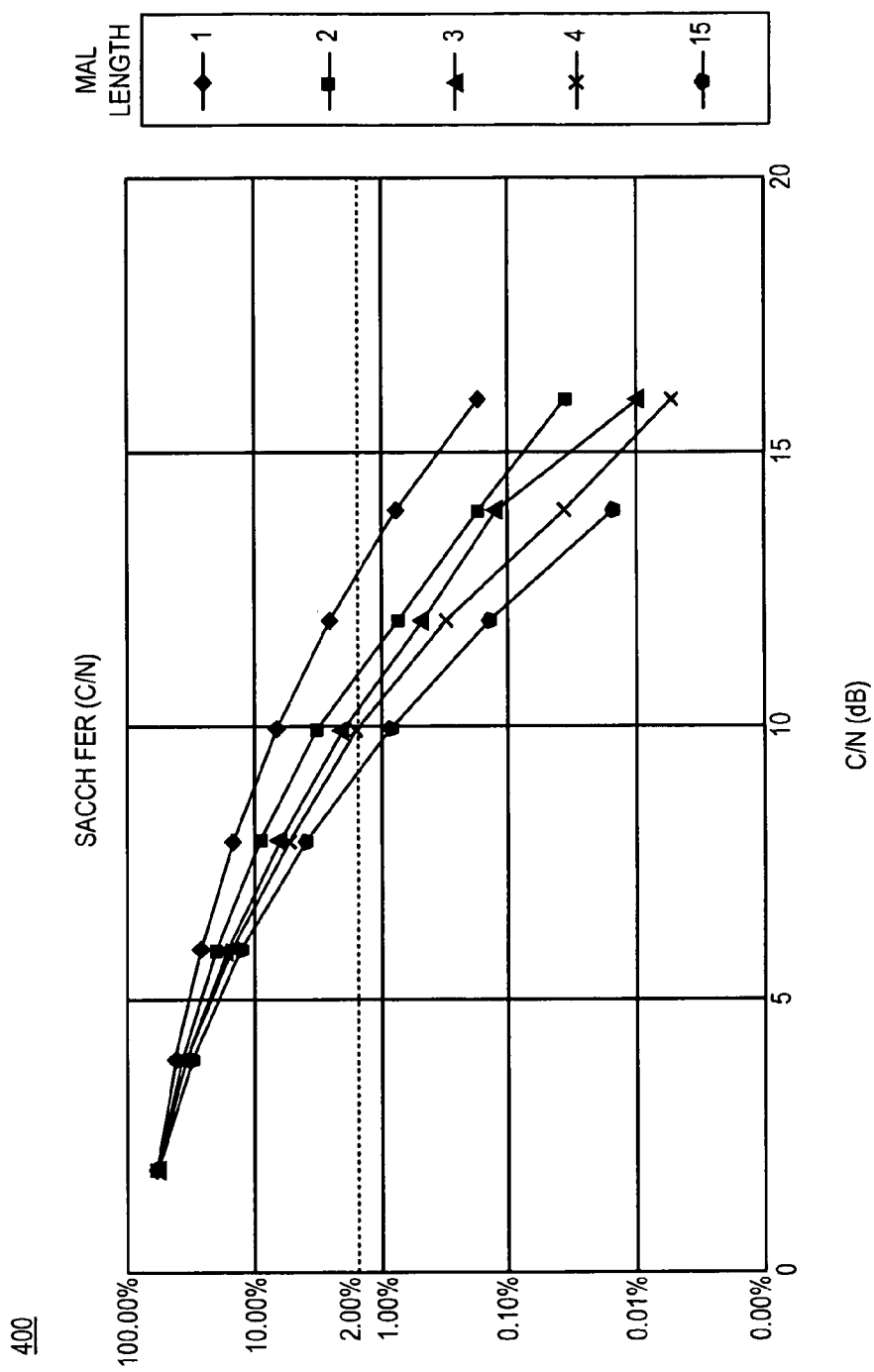
FIG. 4 is a frame erasure rate plot illustrating a set of coverage converage based FER relationships according to one exemplary embodiment.

Referring now to FIG. 4, a frame erasure rate plot illustrates a set of coverage based FER relationships according to one exemplary embodiment. A family of SACCH FER curves can represent the FER relationships for various MAL lengths. These relationships can be part of the FER model 264 used by the probability calculator 260. The FER model 264 for a given service type, channel profile and speed can be a set of FER relationships to C/N for given MAL lengths. The illustrated example shows SACCH FER relationships for a TU3 environment having power profile TU and mobile radio speed of three km/hr.

An example FER threshold used for poor FER can be two percent. A dotted line in the illustration shows the example FER threshold of two percent. Different thresholds can also be used.

Referring now to FIG. 5, a set of threshold tables illustrate minimum required C/I and C/N thresholds as a function of MAL length according to one exemplary embodiment. Using the example FER thresholds of two percent shown in FIG. 3 and FIG. 4, the C/I and C/N values that intersect the threshold line are shown in the threshold tables for various MAL length values. Table 510 shows C/I values at the two percent threshold from the SACCH FER relationships illustrated in FIG. 3. Table 520 shows C/N values at the two percent threshold from the SACCH FER relationships illustrated in FIG. 4. Different FER thresholds than two percent can also be used.

Frequency diversity gain (FDGAIN) shows the marginal gain from adding additional frequencies to the hop set list. Adding additional frequencies to the hop set list increases the MAL length or MALSIZE and increases the FDGAIN. The C/I, C/N, and FDGAIN values are shown in dB.

Figure 6:
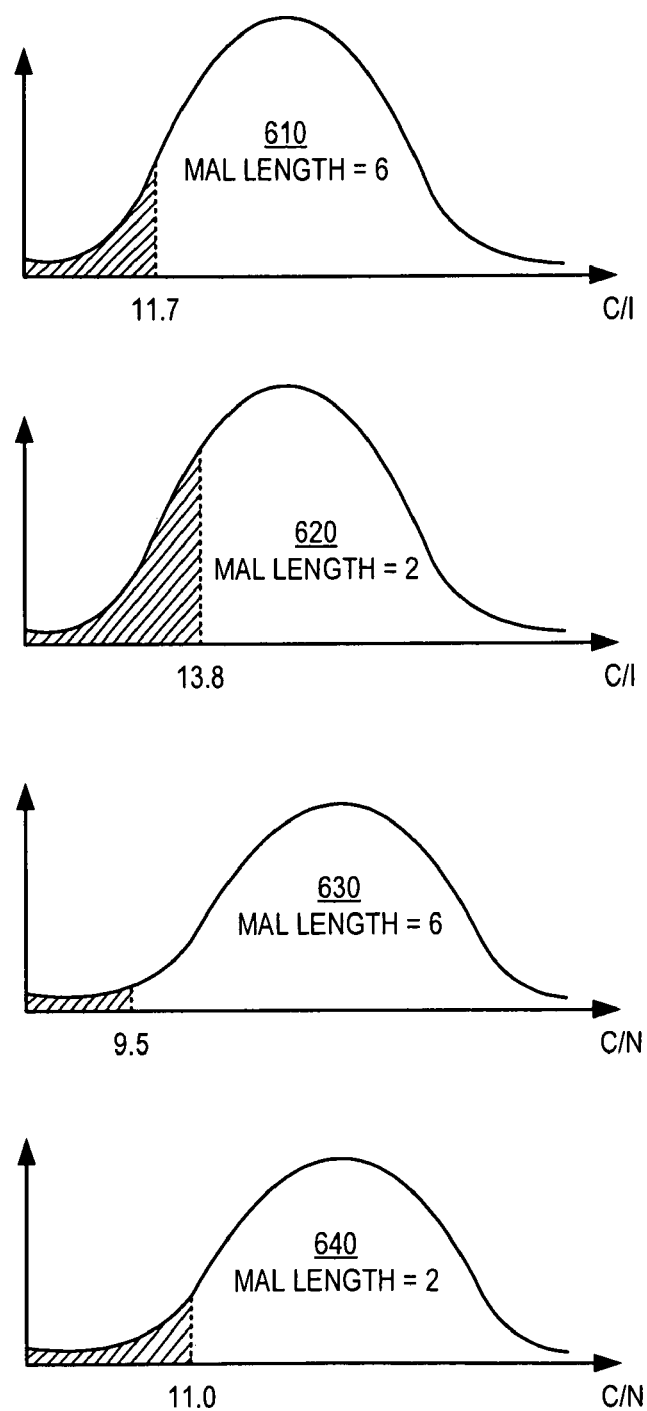
FIG. 6 is a set of distribution curves illustrating the determination of FER probabilities according to one exemplary embodiment.

Referring now to FIG. 6, a set of distribution curves illustrate the determination of FER probabilities according to one exemplary embodiment. A first distribution curve 610 represents a C/I distribution. The C/I distribution may be provided within an IM 210. Given the victim cell MAL length 220 of six, a two percent threshold Ca value of 11.7 dB can be identified from table 510. A value for $P_K$ 275 can be obtained from the Ca distribution and the threshold CA value of 11.7 dB. This value can be represented as the probability that Ca is less than 11.7 dB in the given CA distribution. In the illustrated example, the probability $P_K$ 275 can be approximately five percent. This calculation can be carried out by the $P_K$ calculator 266.

A second distribution curve 620 represents a CA distribution. The Ca distribution may be provided within an IM 210. Given the victim cell MAL length 220 of two, a two percent threshold CA value of 13.8 dB can be identified from table 510. A value for $P_K$ 275 can be obtained from the Ca distribution and the threshold CA value of 13.8 dB. This value can be represented as the probability that C/I is less than 13.8 dB in the given CA distribution. In the illustrated example, the probability $P_K$ 275 can be approximately eight percent. This calculation can be carried out by the $P_K$ calculator 266.

A third distribution curve 630 represents a C/N distribution. The C/N distribution may be provided as the coverage distribution 230. Given the victim cell MAL length 220 of six, a two percent threshold C/N value of 9.5 dB can be identified from an interpolated version of table 520. A value for $P_{COV}$ 270 can be obtained from the C/N distribution and the threshold C/N value of 9.5 dB. This value can be represented as the probability that C/N is less than 9.5 dB in the given C/N distribution. In the illustrated example, the probability $P_{COV}$ 270 can be approximately two percent. This calculation can be carried out by the $P_{COV}$ calculator 262.

A fourth distribution curve 640 represents a C/N distribution. The C/N distribution may be provided as the coverage distribution 230. Given the victim cell MAL length 220 of two, a two percent threshold C/N value of 11.0 dB can be identified from table 520. A value for $P_{COV}$ 270 can be obtained from the C/N distribution and the threshold C/N value of 11.0 dB. This value can be represented as the probability that C/N is less than 11.0 dB in the given C/N distribution. In the illustrated example, the probability $P_{COV}$ 270 can be approximately three percent. This calculation can be carried out by the $P_{COV}$ calculator 262.

Referring now to FIG. 7A, a base station mapping diagram 700 illustrates handover characteristics for two neighboring base stations according to one exemplary embodiment. A performance model can characterize neighboring broadcast control channel (BCCH) performance. Second order neighbor relationships can support determining the likelihood that a handover from a serving cell to a candidate neighbor cell will fail due to interference. This interference can be on a broadcast control channel (BCCH) of a neighbor cell. The frequency planning optimizations discussed herein can seek to reduce the percentage of handover failures caused by second order CO-BCCH-BCCH interference. CO-BCCH-BCCH interference can be interference between BCCH channels of second order neighbors. The BCCH neighbor performance model can attempt to avoid frequency assignments that would cause false base station identification (BSIC) decoding. Frequency assignments that may reduce signal quality on the BCCH frequency of neighboring cells at handover time may also be avoided.

Two cells can be referred to as second order neighbors if they are both present in the neighbor list of another cell. For example, the neighbor list for cell CA001X may include cells CA001Y, CA001Z, and CA002X. These cells may have associated outgoing handover attempt statistics of 500, 200, and 300 respectively. From this example list of three neighbors, six handover pairs, or second order neighbors, can be constructed: (CA001Y, CA001Z), (CA001Y, CA002X), (CA001Z, CA001Y), (CA001Z, CA002X), (CA002X, CA001Y), and (CA002X, CA001Z).

A neighbor list having n neighbor cells can have n*(n−1) permutations for combining these cells into pairs. Thus, there can be n*(n−1) second order neighbor relationships. For each cell, the probability of handover failure for each of its second order neighbor pairs can be calculated.

In an example scenario, the C/I in the serving area of sector CA002Y may be favorable with respect to co-channel CA001Y. That is, sector CA001Y may not be causing co-channel interference to CA002Y. As such an instance, the frequency plan may be considered acceptable from the point of view of this particular interference. The cells CA001Y and CA002Y may both be present in the neighbor list of CA002Z and therefore sectors CA001Y and CA002Y can be considered second order neighbors.

A mobile radio may be moving in the eastward direction along a highway 710. The mobile can make a handover at point A from sector CA001Y to sector CA002Z. The next handover can be at point B from sector CA002Z to sector CA002Y. The mobile can measure the BCCH channels in its BCCH allocation list (BAL). The mobile can decode the BSIC values from these BCCH channels. Assume, for this example, a frequency allocation where CA001Y and CA002Y both have BCCH frequency 512. If the mobile approaches point B before the BSIC of CA002Y is properly decoded for BCCH 512, the mobile may incorrectly handover to CA001Y with BCCH 512. When such a handover to the incorrect neighbor CA001Y occurs, the mobile may be connected to CA001Y outside its intended coverage area where the signal may be weak. Since the new serving cell signal and the signal from other neighbors are all weak this situation may very likely lead to a dropped call.

It can be determined how far co-channels should be spaced to prevent such false handovers. This determination can be made in terms of the speed of the mobile. The distance between CO-BCCH-BCCH reuse cells can be allocated such that a mobile can have enough time to decode the BSIC of the first neighbor and then have enough time to decode the BSIC of the new neighbor with the same BCCH. The distance between A and B is roughly half of the distance between the second order neighbor pair CA001Y and CA002Y. According to one example, the longest time it could take to decode a new BSIC is twenty-six seconds or two times a frame period which, in this example, may be thirteen seconds. Thus, the spacing constraint can be expressed and reduced as follows:

$$t_{AB} > 13*2 \text{ secs}$$

$$d_{AB}/v_M > 13*2 \text{ secs}$$

$$d_{AB} > 13*2*v_M \text{ secs}$$

$$0.5*d_{2NBR} > 13*2*v_M \text{ secs}$$

$$d_{2NBR} > 13*2*2*v_M \text{ secs}$$

$$d_{2NBR} > (52 \text{ secs})*v_M$$

where $t_{AB}$ can be defined as the time for the mobile to go from point A to point B, $d_{AB}$ can be defined as a distance between points A and B, $d_{2NBR}$ can be twice that distance or the distance between two second order neighbor cells, and $v_M$ can be the speed of the mobile radio. Thus, for a mobile moving at 60 mph, a CO-BCCH-BCCH distance between second order neighbors of about one mile or more can reduce the described false handover scenario. Similarly, for a mobile moving at 30 mph, second order neighbor cells can be separated by about one half mile or more to reduce the false handover effect.

Figure 7B:
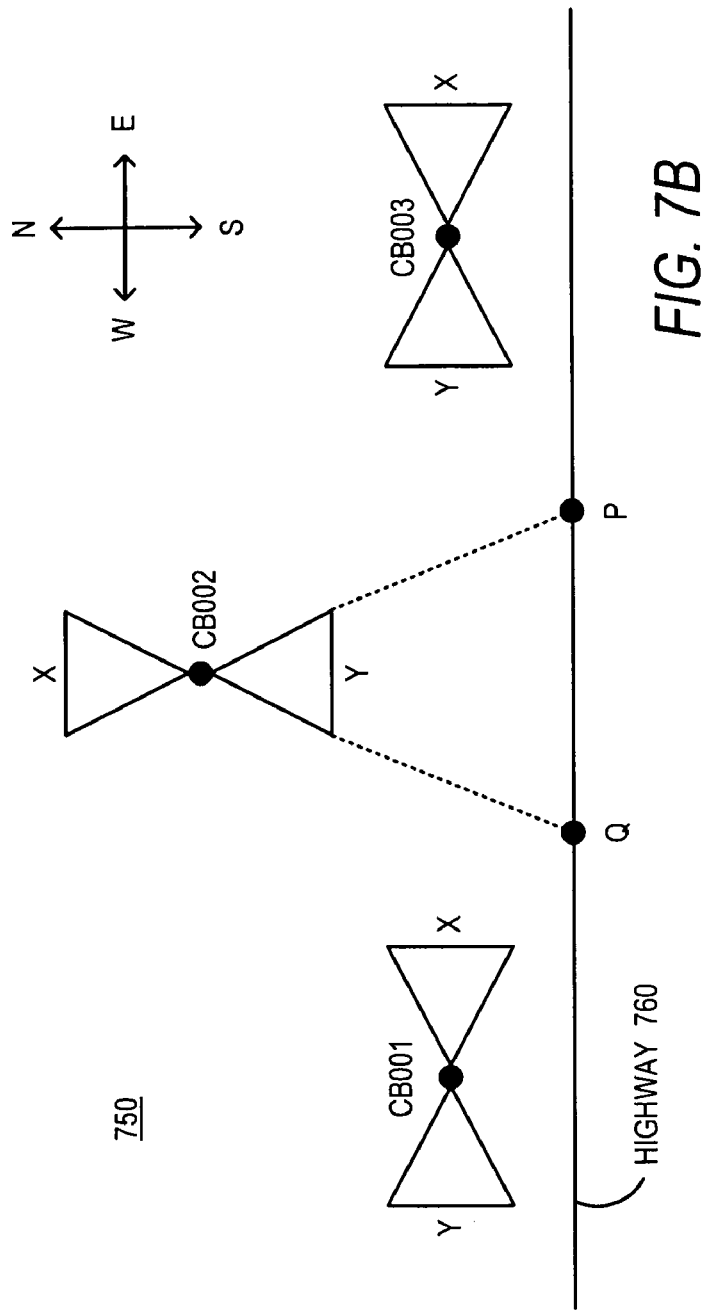
FIG. 7B is a base station mapping diagram interference in handover areas between neighboring base stations according to one exemplary embodiment.

Referring now to FIG. 7B, a base station mapping diagram 750 illustrates interference in handover areas between neighboring base stations according to one exemplary embodiment. Broadcast control channel (BCCH) interference within handover areas may prevent the base station identification (BSIC) of neighbor cells from being decoded. It may be desirable for BSIC decoding to be achieved for the most dominant or strongest neighbors. Handovers may occur at point Q from sector CB001X to sector CB002Y. Handovers may also occur at point P from sector CB001Y to sector CB003Y.

According to an example, a mobile radio may be moving in the eastward direction along a highway 760 and may be using sector CB002Y. At point P the mobile can measure neighboring sector CB003Y by decoding the BSIC of neighboring sector CB003Y. This BSIC decoding should occur so that the mobile can handover to sector CB003Y. A C/I ratio associated with the BSIC detection may be determined where the carrier signal is the receive level of the CB003Y signal and interference signal may be a combination of any other interferers on the same BCCH. Alternatively, the interference signal may be evaluated as that of the strongest interferer. The C/I ratio being high enough may properly support the BSIC being decoded.

Referring now to FIG. 8, a wireless performance table illustrates performance metrics for different optimization models according to one exemplary embodiment. Traditional call quality objectives for AFP can use an interference only objective or percentage of traffic with poor C/I. A frequency plan optimizing percentage of traffic with poor FER can provide improved results for a C/I related metric as well. Furthermore, the FER call quality model can support optimization of MAL length as an additional degree of freedom.

Table 810 illustrates simulation results that support the effectiveness of the FER model. Two different metrics are used, one for the percentage of traffic having a carrier to interference less than a threshold of 12 dB, and a second metric for the percentage of traffic having FER greater than two percent. Using either metric, in this example, the FER model for frequency planning yielded improved performance over the traditional interference only model.

Figure 9:
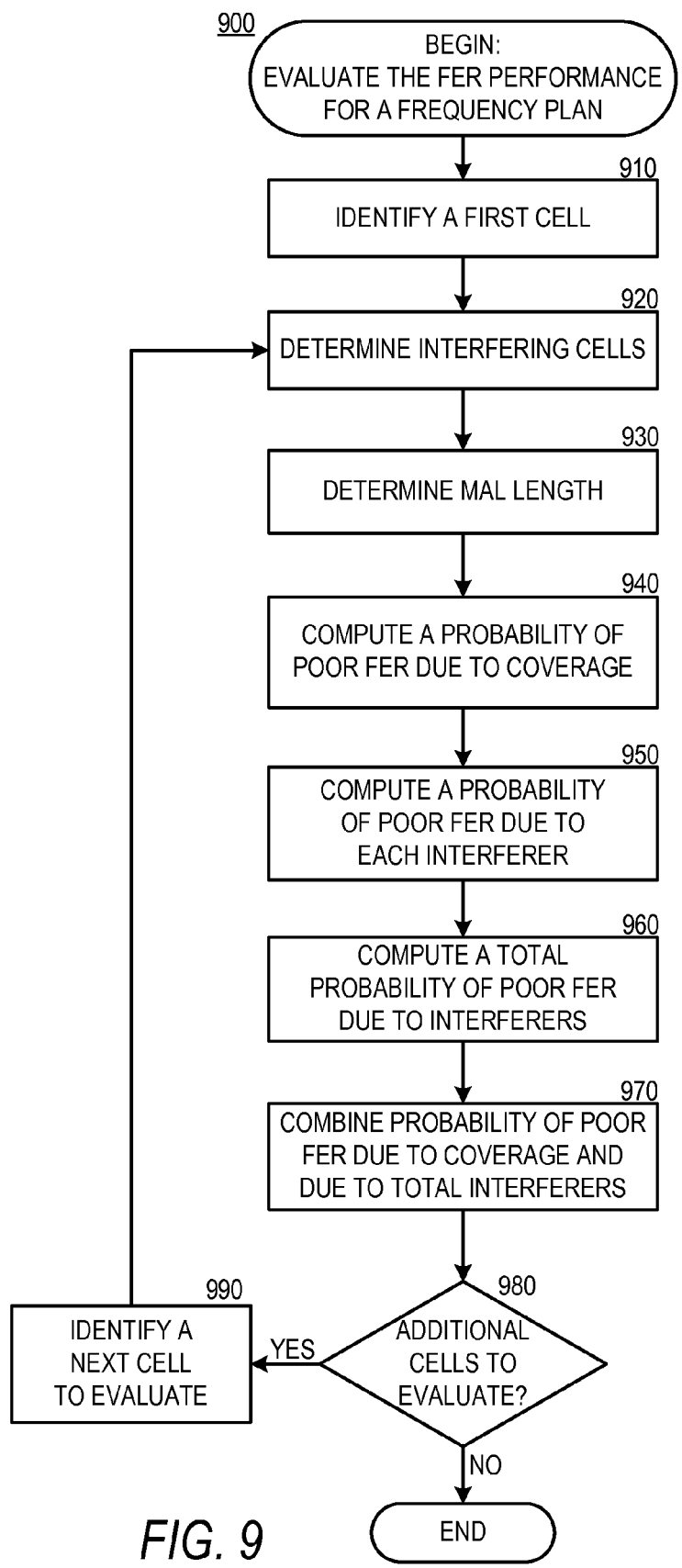
FIG. 9 is a logical flow diagram illustrating a process for evaluating the FER performance of a frequency plan according to one exemplary embodiment.

Turning now to FIG. 9, additional details will be provided regarding the embodiments presented herein for frequency planning optimization within a mobile wireless radio network. In particular, FIG. 9 is a flow diagram showing a routine 900 that illustrates aspects of a process for evaluating the FER performance of a frequency plan according to one embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 900 can operate on a set of cells for which a frequency plan is being analyzed. The routine 900 can begin with operation 910 where a first cell within the set of cells to be analyzed is identified to be evaluated. At operation 920, interfering cells can be identified. For example, these interfering cells can be ones having co-channel and/or adjacent channel frequency reuse.

At operation 930, a MAL length of the victim cell can be determined. MAL length can be treated as a free variable in optimizing the frequency plan. As such, the FER performance determination of routine 900 may be performed over a range of MAL lengths for each cell in order to optimize a specific MAL length for each cell in terms of FER performance. Alternatively, the routine 900 could be implemented to itself iterate over a possible range of MAL lengths while evaluating each cell. Either approach may result in possible MAL length values for each cell being evaluated for optimization.

At operation 940, a probability of poor FER due to coverage can be computed. For a given MAL length and probability threshold, a coverage to FER relationship within an FER model 264 can be evaluated for a given channel profile, speed, and service type. The C/N value obtained from the coverage relationship evaluation can be applied to a coverage distribution 230 as illustrated in FIG. 6. From the coverage distribution 230, a probability of poor FER due to coverage can be computed by a $P_{COV}$ calculator 262.

At operation 950, a probability of poor FER due to each interferer can be computed. For a given MAL length and probability threshold, an interference coverage to FER relationship within an FER model 264 can be evaluated for a given channel profile, speed, and service type. The C/I value obtained from the coverage relationship evaluation can be applied to a C/I distribution within an IM 210 as illustrated in FIG. 6. From the C/I distribution, a probability of poor FER due to interference can be computed by a $P_K$ calculator 266.

At operation 960, a total probability of poor FER due to interference $P_I$ 286 can be computed by combining the $P_K$ values 275 determined in operation 950 for each of the interfering cells. This can be performed by a $P_K$ combiner 284 according to the expression:

$$P_I = 1-(1-P_1)*(1-P_2)* \ldots *(1-P_M)$$

At operation 970, the probability of poor FER due to coverage and the probability of poor FER due to interferers can be combined. This can be performed by a coverage and interference probability combiner 282 to generate a $P_{FER}$ value 290 according to the expression:

$$P_{FER} = P_I + W*P_{COV}$$

as discussed with respect to FIG. 2. The $P_{FER}$ value 290 for the cell being evaluated can provide the probability that the cell will have FER performance below the specified threshold according to the frequency plan being evaluated. This probability can provide a key metric for informing optimization of the frequency plan.

At operation 980, it is determined if there are additional cells within the frequency plan set to be evaluated. If it is determined that there are no additional cells, routine 900 can terminate. If it is determined that there are additional cells to evaluate, operation 990 can identify a next cell for evaluation prior to the routine 900 looping back to operation 920 to begin evaluation of the next cell.

Figure 10:
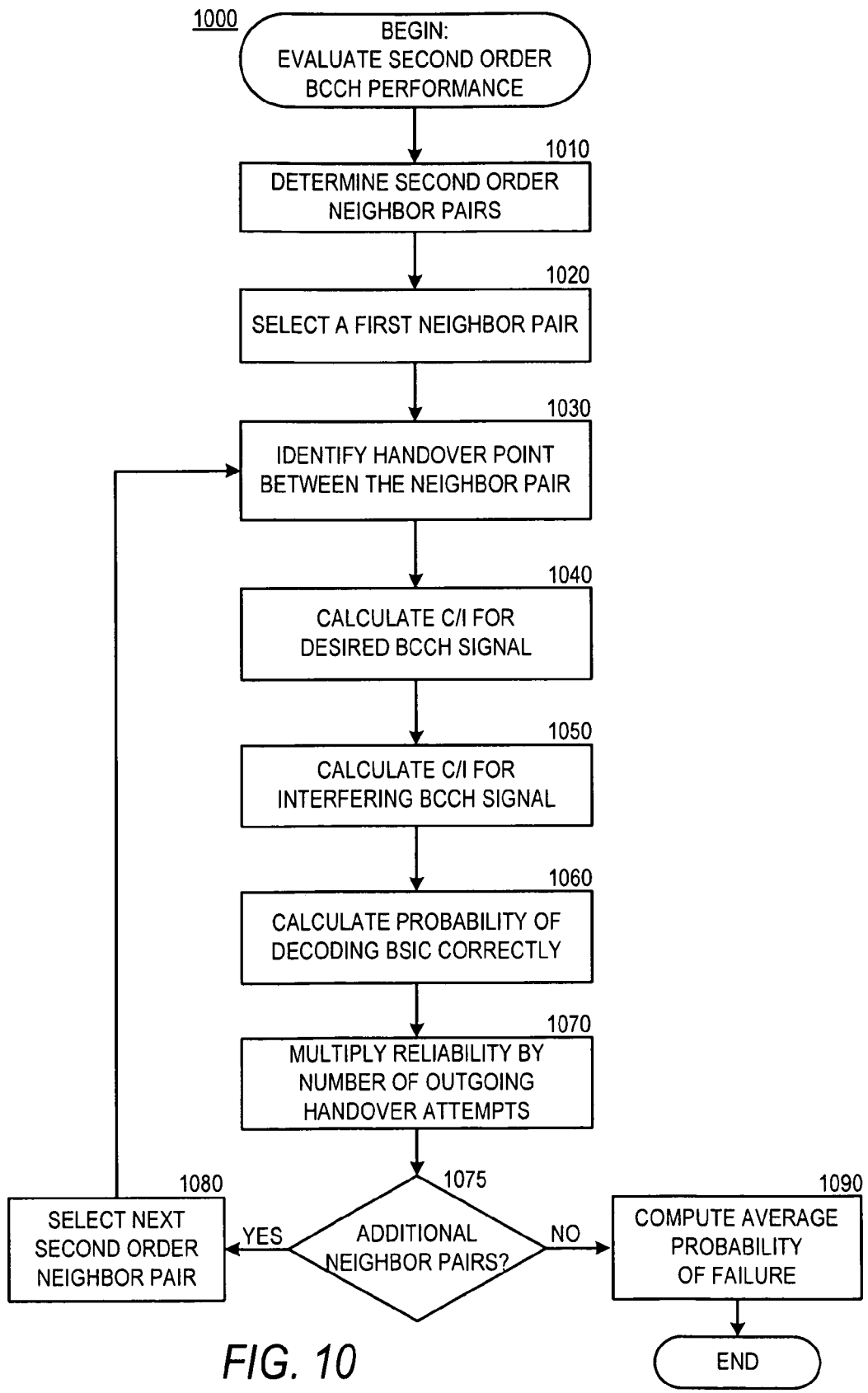
FIG. 10 is a logical flow diagram illustrating a process for evaluating second order BCCH performance according to one exemplary embodiment.

Turning now to FIG. 10, additional details will be provided regarding the embodiments presented herein for frequency planning optimization within a mobile wireless radio network. In particular, FIG. 10 is a flow diagram showing a routine 1000 that illustrates aspects of a process for evaluating second order BCCH performance according to one embodiment. The routine 1000 can begin with operation 1010 where a set of second order neighbor pairs may be determined. Two cells can be referred to as second order neighbors if they are both present in the neighbor list of another cell. A given cell having n neighbor cells can have n*(n−1) permutations for combining these cells into ordered pairs. Thus, there can be n*(n−1) second order neighbor relationships.

At operation 1020, a first neighbor pair is selected from the set determined in operation 1010. At operation 1030, a handover point between the neighbor pair can be identified. For example, the physical midpoint between the two cells may be considered the handover point. The handover point may also be a function of power or other parameters related to the two cells.

At operation 1040, the C/I ratio for the desired BCCH signal can be calculated. This calculation may be performed using a standard propagation model, antenna orientation assigned to each cell, and effective isotropic radiated power (EIRP) from each cell.

At operation 1050, the C/I ratio for each interfering BCCH signal can be calculated. This calculation may be performed using a standard propagation model, antenna orientation assigned to each cell, and effective isotropic radiated power (EIRP) from each cell.

At operation 1060, the probability of decoding the BSIC correctly can be calculated. This calculation may be based on the C/I values determined in operation 1040 and 1050. The resultant probability may be referred to as the Reliability.

At operation 1070, the Reliability can be multiplied by the number of outgoing handover attempts to determine individual probabilities of failure.

At operation 1075, it can be determined if there are additional neighbor pairs to be evaluated from the set of pairs determined in operation 1010. If it is determined that there are additional neighbor pairs to be evaluated, operation 1080 can identify a next second order neighbor pair from the set to evaluate. Next, the routine 1000 can loop back to operation 1030 to begin evaluation of the next neighbor pair.

If instead it is determined at operation 1075 that there are no additional neighbor pairs to be evaluated, the routine 1000 can transition to operation 1090. At operation 1090, the average probability of handover failure can be computed. The average can be computed by summing up the probability of failure values obtained in operation 1070 and dividing the result by a sum of the handover attempts. The routine 1000 can terminate after operation 1090.

Figure 11:
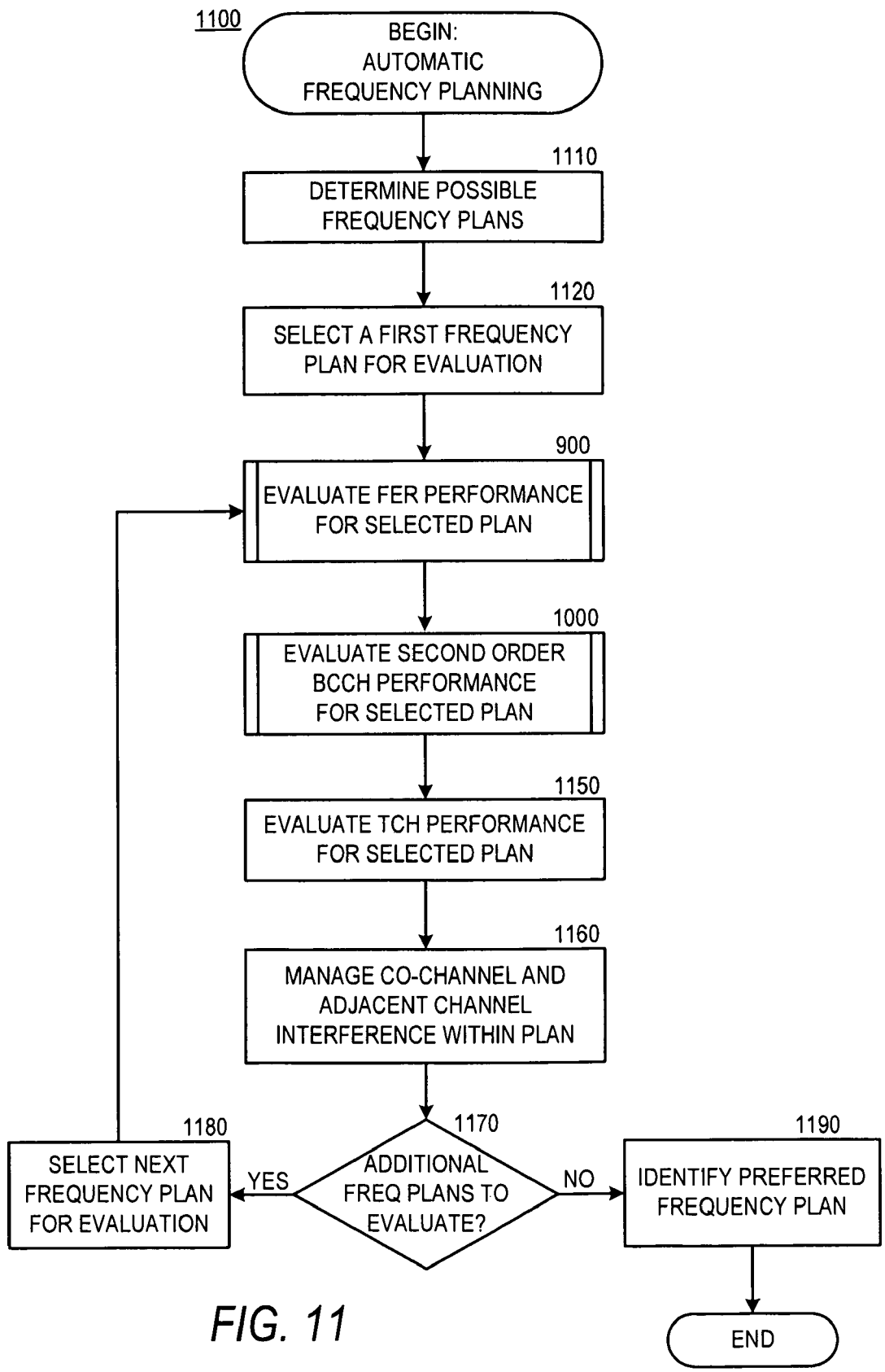
FIG. 11 is a logical flow diagram illustrating a process for automatic frequency planning according to one exemplary embodiment.

Turning now to FIG. 11, additional details will be provided regarding the embodiments presented herein for frequency planning optimization within a mobile wireless radio network. In particular, FIG. 11 is a flow diagram showing a routine 1100 that illustrates aspects of a process for automatic frequency planning according to one embodiment. The routine 1100 can establish a set of possible frequency plans for a given mobile wireless network and then evaluate each of the possible plans to identify a preferred plan for implementation. The evaluation can include FER performance, handover performance, and interference management with respect to co-channel and adjacent channel interferers. The routine 1100 can begin with operation 1110 where possible frequency plans are determined. This can include laying out all possible plans given the system resources. Determining possible plans may also include heuristically selecting or pruning the total possible set of plans into a likely or reasonable set of plans to be evaluated. At operation 1120, a plan from the set of plans determined in operation 1110 is selected to be evaluated first.

After operation 1120, routine 900 can be used to evaluate the FER performance for the selected plan as discussed in detail with respect to FIG. 9. Next, routine 1000 can be used to evaluate second order neighbor BCCH performance for the selected plan as discussed in detail with respect to FIG. 10.

At operation 1150, a neighbor TCH (traffic channel) performance model may be used to evaluate the selected plan. TCH neighbor performance can reduce interference in handover areas and thus reduce the number of drop calls during handovers. The average probability of collision per HO attempt can be determined. Minimizing this metric can reduce interference during handovers on the TCH layer that may result in improved drop call rate performance. The probability of collision for each neighbor relationship with co-channel interference on the TCH layer can be multiplied by the number of handover attempts on that neighbor. This value can be summed from all neighbors and then divided by the total number of handover attempts on the network. The resulting metric can be referred to as the average probability of collisions per handover attempts. This metric can be used in evaluating and comparing the various frequency planes determined in operation 1110.

At operation 1160, co-channel interference and adjacent channel interference can be managed. Co-channel interference may be reduced at the expense of increased adjacent channel interference. When considering individual interference components, each can be ignored or not based on imposed thresholds. An individual interference component can be defined for a given victim cell as the amount of interference from a single interfering cell for a given reuse type. For example, in a GSM system, four types of reuse may be considered involving BCCH channels and TCH channels: victim BCCH with interfering BCCH, victim BCCH with interfering TCH, victim TCH with interfering BCCH, and victim TCH with interfering TCH.

Based on results obtained in one experimental network, up to 4% of adjacent channel interference can be ignored when BCCH is the victim and up to 1% can be ignored when TCH is the victim. This can be supported by the condition that the serving signal level can be separated by 6 dB or more from the interferer signal level in many cases where adjacent-channel interference is present. Two such cells may be designated as neighbors. An example hysteresis level may be around 3 dB, so when the average interference (C/I) goes less than −3 dB, a handover may occur. The averaging period may be taken as eight SACCH periods or around four seconds. Therefore, the percentage of time that a C/I less than <−6 dB may be very small and unlikely to cause detrimental effects such as call drops. A short period of poor signal quality might be experienced for one or two seconds, for example, but may not be perceived by the user. The amount of co-channel interference can be greatly reduced. The benefits of improved co-channel interference can provide significant improvement to observed network performance.

At operation 1170, it can be determined if there are additional frequency plans to be evaluated from the set of frequency plans determined in operation 1110. If it is determined that there are additional frequency plans to be evaluated, operation 1180 can identify a next frequency plan from the set to evaluate. Next, the routine 1100 can loop back to subroutine 900 to begin evaluation of the next frequency plan.

If instead it is determined at operation 1170 that there are no additional frequency plans to be evaluated, the routine 1100 can transition to operation 1190. At operation 1190, a preferred frequency plan may be identified. The preferred frequency plan may be identified based upon the FER performance from routine 900, the BCCH performance from routine 1000, the TCH performance from operation 1150, the co-channel, adjacent channel interference from operation 1160, an implementation cost metric, or any combination, weighted combination, or conditional combination thereof.

The implementation cost metric may include capital expenditure, operational expenses, resource allocation, any other cost metric, or any combination thereof. The routine 1100 can terminate after operation 1190.

The adjacent channel interference can be increased since it may be present for a short period of time and may not be detrimental to the system. As a trade-off, more co-channel interference may be resolved. Applying this approach can improve BCCH performance. Alternatively, BCCH performance can be maintained by clearing a number of BCCH channels and using the resources in the TCH pool to improve TCH performance resulting from increased available TCH spectrum. Since voice may be more loaded on the TCH layer, voice quality and drop call rate performance may be improved. An example approach may be to scale the adjacent channel interference by a factor of 18 dB down from the definition within the GSM specification.

Figure 12:
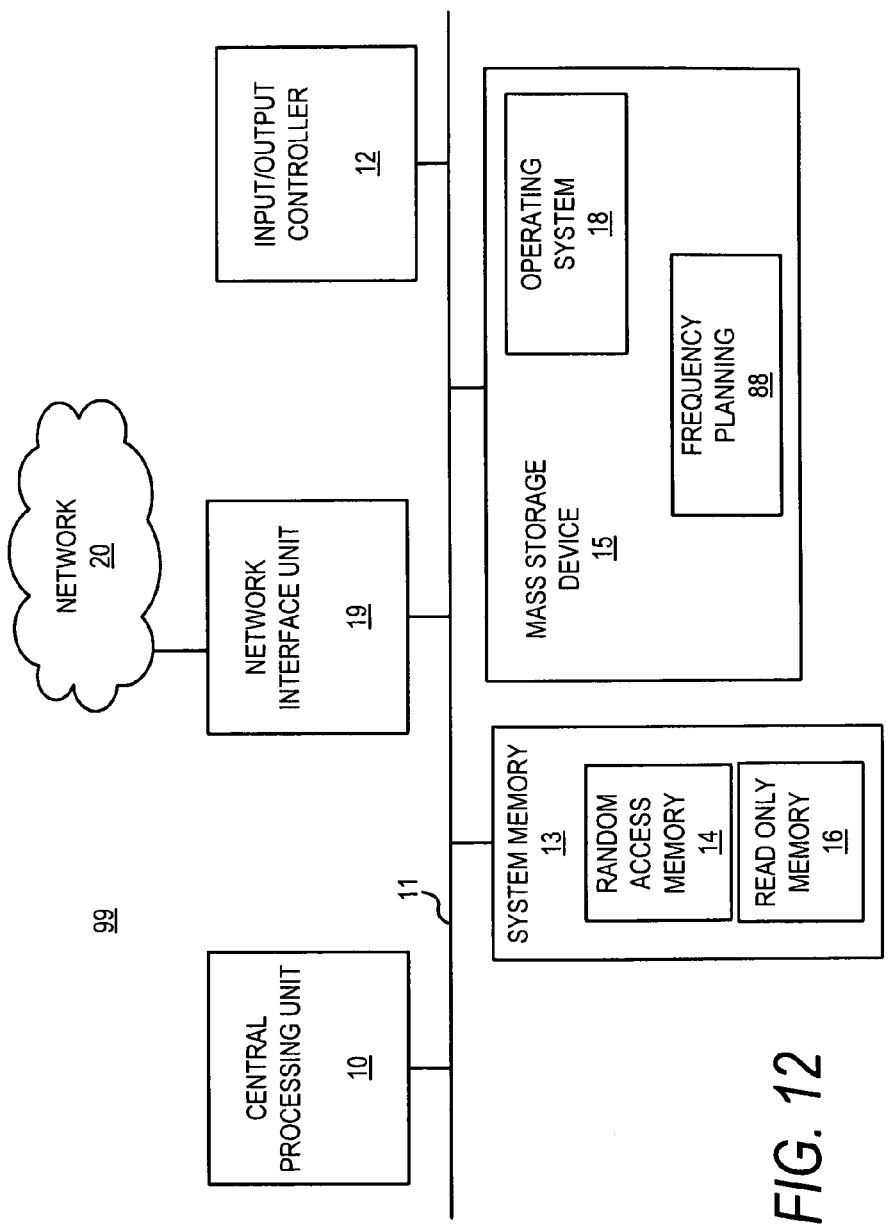
FIG. 12 is a computer architecture diagram illustrating computing system hardware capable of frequency planning within a mobile wireless radio network according to one exemplary embodiment.

Turning now to FIG. 12, an illustrative computer architecture 99 can execute software components described herein for frequency planning optimization within a mobile wireless radio network. The computer architecture shown in FIG. 12 illustrates an embedded control computer, a frequency planning controller system, a conventional desktop, a laptop, or a server computer and may be utilized to execute aspects of the software components presented herein. It should be appreciated however, that the described software components can also be executed on other example computing environments, such as mobile devices, television, set-top boxes, kiosks, vehicular information systems, mobile telephones, embedded systems, or otherwise.

The computer architecture illustrated in FIG. 12 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 99, such as during startup, can be stored in the ROM 16. The computer 99 may further include a mass storage device 15 for storing an operating system 18, software, data, and various program modules, such as those associated with a frequency planning system 88.

The mass storage device 15 can be connected to the CPU 10 through a mass storage controller (not illustrated) connected to the bus 11. The mass storage device 15 and its associated computer-readable media can provide non-volatile storage for the computer 99. Although the description of computer-readable media contained herein refers to a mass storage device, such as a hard disk or CD-ROM drive, it should be appreciated by those skilled in the art that computer-readable media can be any available computer storage media that can be accessed by the computer 99.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 99.

According to various embodiments, the computer 99 may operate in a networked environment using logical connections to remote computers through a network such as the network 20. The computer 99 may connect to the network 20 through a network interface unit 19 connected to the bus 11. It should be appreciated that the network interface unit 19 may also be utilized to connect to other types of networks and remote computer systems. The computer 99 may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

As mentioned briefly above, a number of program modules and data files may be stored in the mass storage device 15 and RAM 14 of the computer 99, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the natural language engine 130 for execution by the CPU 10. The frequency planning system 88 can include software components for implementing portions of the processes discussed in detail with respect to FIGS. 1-11. The mass storage device 15, the ROM 16, and the RAM 14 may also store other types of program modules.

Based on the foregoing, it should be appreciated that technologies for frequency plan optimization within a mobile wireless radio network are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for frequency planning within a mobile wireless communications network, the method comprising computer-implemented operations for:
   determining a plurality of frequency plans for the mobile wireless communications network, each of the frequency plans comprising a frequency allocation model representing allocation of frequencies at locations within the wireless communications network;
   determining a frame erasure rate performance metric for each of at least two of the frequency plans, the frame erasure rate performance metric being based upon a number of frames erased during a period of time from a data stream associated with a communications channel of the wireless communications network;
   determining, for each of the at least two frequency plans, a second order broadcast control channel performance metric associated with the frequency plan;
   comparing the at least two frequency plans based, at least partially, upon the frame erasure rate performance metrics and the second order broadcast control channel performance metrics associated with the frequency plans; and
   identifying a preferred frequency plan based, at least partially, upon the comparing.

2. The method of claim 1, wherein
   determining the second order broadcast control channel performance metric comprises identifying two cells, determining a handover point between the two cells, determining a carrier to interference ratio at the handover point, and identifying a probability of decoding a base station identification correctly at the handover point based, at least partially, upon the carrier to interference ratio at the handover point, and wherein
   comparing the second order broadcast control channel performance metrics associated with the frequency plans comprises comparing probabilities of decoding the base station identification correctly at the handover point associated with each of the frequency plans.

3. The method of claim 2, wherein comparing the at least two frequency plans further comprises
   determining, for each of the at least two frequency plans, a traffic channel performance metric associated with a traffic channel between two neighbor cells, and
   comparing the traffic channel performance metrics associated with each of the at least two frequency plans.

4. The method of claim 1, wherein the frame erasure rate performance metric is further based upon a handover failure rate associated with the frequency plan.

5. The method of claim 1, wherein comparing the at least two frequency plans further comprises
   determining, for each of the at least two frequency plans, a mobile allocation list length specifying a frequency hop set length for each of two or more cells, and
   comparing the mobile allocation list lengths associated with each of the at least two frequency plans.

6. The method of claim 1, wherein comparing the at least two frequency plans further comprises determining, for each of the at least two frequency plans, a probability that the frame erasure rate exceeds a threshold rate.

7. The method of claim 1, wherein the frame erasure rate performance metric is further based upon frame erasure due to coverage quality and frame erasure due to interference.

8. A computer storage medium having computer-executable instructions stored thereon which, when executed by a computer system, cause the computer system to:
   determine a plurality of frequency plans for a wireless communications network, each of the frequency plans comprising a frequency allocation model representing allocation of frequencies at locations within the wireless communications network;
   determine a frame erasure rate performance metric for each of at least two of the frequency plans, the frame erasure rate performance metric being based upon a number of frames erased during a period of time from a data stream associated with a communications channel of the wireless communications network;
   determine, for each of the at least two frequency plans, a second order broadcast control channel performance metric associated with the frequency plan;
   compare the at least two frequency plans based, at least partially, upon the frame erasure rate performance metrics and the second order broadcast control channel performance metrics associated with the frequency plans; and
   identify a preferred frequency plan based, at least partially, upon the comparing.

9. The computer storage medium of claim 8, wherein
   determining the second order broadcast control channel performance metric comprises identifying two cells, determining a handover point between the two cells, determining a carrier to interference ratio at the handover point, and identifying a probability of decoding a base station identification correctly at the handover point based, at least partially, upon the carrier to interference ratio at the handover point, and wherein comparing the second order broadcast control channel performance metrics associated with the frequency plans comprises comparing probabilities of decoding the base station identification correctly at the handover point associated with each of the frequency plans.

10. The computer storage medium of claim 9, wherein comparing the at least two frequency plans further comprises
determining, for each of the at least two frequency plans, a traffic channel performance metric associated with a traffic channel between two neighbor cells, and
comparing the traffic channel performance metrics associated with each of the at least two frequency plans.

11. The computer storage medium of claim 8, wherein the frame erasure rate performance metric is further based upon a handover failure rate associated with the frequency plan.

12. The computer storage medium of claim 8, wherein comparing the at least two frequency plans further comprises
determining, for each of the at least two frequency plans, a mobile allocation list length specifying a frequency hop set length for each of two or more cells, and
comparing the mobile allocation list lengths associated with each of the at least two frequency plans.

13. The computer storage medium of claim 8, wherein comparing the at least two frequency plans further comprises determining, for each of the at least two frequency plans, a probability that the frame erasure rate exceeds a threshold rate.

14. The computer storage medium of claim 8, wherein the frame erasure rate performance metric is further based upon frame erasure due to coverage quality and frame erasure due to interference.

15. A frequency planning system comprising:
a frequency planning controller;
one or more interfaces between the frequency planning controller and a wireless communications network;
a processing unit associated with the frequency planning controller; and
a module for execution on the processing unit, the module comprising computer-executable instructions that, when executed by the processing unit, cause the frequency planning controller to
determine a plurality of frequency plans for the wireless communications network, each of the frequency plans comprising a frequency allocation model representing allocation of frequencies at locations within the wireless communications network,
determine a frame erasure rate performance metric for each of at least two of the frequency plans, the frame erasure rate performance metric being based upon a number of frames erased during a period of time from a data stream associated with a communications channel of the wireless communications network,
determine, for each of the at least two frequency plans, a second order broadcast control channel performance metric associated with the frequency plan,
compare the at least two frequency plans based, at least partially, upon the frame erasure rate performance metrics and the second order broadcast control channel performance metrics associated with the frequency plans, and
identify a preferred frequency plan based, at least partially, upon the comparing.

16. The frequency planning system of claim 15, wherein determining the second order broadcast control channel performance metric comprises identifying two cells, determining a handover point between the two cells, determining a carrier to interference ratio at the handover point, and identifying a probability of decoding a base station identification correctly at the handover point based, at least partially, upon the carrier to interference ratio at the handover point, and wherein comparing the second order broadcast control channel performance metrics associated with the frequency plans comprises comparing probabilities of decoding the base station identification correctly at the handover point associated with each of the frequency plans.

17. The frequency planning system of claim 16, wherein comparing the at least two frequency plans further comprises
determining, for each of the at least two frequency plans, a traffic channel performance metric associated with a traffic channel between two neighbor cells, and
comparing the traffic channel performance metrics associated with each of the at least two frequency plans.

18. The frequency planning system of claim 15, wherein the frame erasure rate performance metric is further based upon a handover failure rate associated with the frequency plan.

19. The frequency planning system of claim 15, wherein comparing the at least two frequency plans comprises
determining, for each of the at least two frequency plans, a mobile allocation list length specifying a frequency hop set length for each of two or more cells, and
comparing the mobile allocation list lengths associated with each of the at least two frequency plans.

20. The frequency planning system of claim 15, wherein the frame erasure rate performance metric is further based upon frame erasure due to coverage quality and frame erasure due to interference.

* * * * *

UNITED STATES PATENT AND TRADEMARK OFFICE
CERTIFICATE OF CORRECTION

PATENT NO. : 8,249,606 B1
APPLICATION NO. : 12/368365
DATED : August 21, 2012
INVENTOR(S) : Neophytou et al.

It is certified that error appears in the above-identified patent and that said Letters Patent is hereby corrected as shown below:

In the Drawings:
In Fig. 2, Sheet 2 of 13, in Box "262", Line 1, delete "Pcov" and insert -- $P_{cov}$ --, therefor at each occurrence in figure 2.

In Fig. 2, Sheet 2 of 13, for Tag "286", delete "Pl" and insert -- $P_l$ --, therefor.

In Fig. 2, Sheet 2 of 13, in Box "284", Line 1, delete "Pk" and insert -- $P_k$ --, therefor at each occurrence in figure 2.

In the Specification:
In Column 2, Line 48, delete "converage".

In Column 4, Line 16, delete "Nobe-B" and insert -- Node-B --, therefor.

In Column 4, Line 25, delete "150" and insert -- 150. --, therefor.

In Column 6, Line 21, delete "250" and insert -- 250, --, therefor.

In Column 8, Line 1, delete "Ca" and insert -- C/I --, therefor.

In Column 8, Line 3, delete "Ca" and insert -- C/I --, therefor.

In Column 8, Line 3, delete "CA" and insert -- C/I --, therefor.

In Column 8, Line 4, delete "Ca" and insert -- C/I --, therefor.

In Column 8, Line 5, delete "CA" and insert -- C/I --, therefor.

In Column 8, Line 9, delete "CA" and insert -- C/I --, therefor.

In Column 8, Line 10, delete "Ca" and insert -- C/I --, therefor.

In Column 8, Line 12, delete "CA" and insert -- C/I --, therefor.

Signed and Sealed this
Twenty-fourth Day of September, 2013

Teresa Stanek Rea
*Deputy Director of the United States Patent and Trademark Office*

CERTIFICATE OF CORRECTION (continued)
U.S. Pat. No. 8,249,606 B1

In Column 8, Line 13, delete "Ca" and insert -- C/I --, therefor.

In Column 8, Line 14, delete "CA" and insert -- C/I --, therefor.

In Column 8, Line 16, delete "CA" and insert -- C/I --, therefor.